United States Patent Office 3,116,342
Patented Dec. 31, 1963

3,116,342
TWO-STAGE SELECTIVE HYDROGENATION OF ACETYLENES
Ralph Lozelu Robinson and William Roy Smith, Norton-on-Tees, England, assignors to Imperial Chemical Industries Limited, London, England, a corporation of Great Britain
No Drawing. Filed June 6, 1960, Ser. No. 33,913
Claims priority, application Great Britain July 2, 1959
12 Claims. (Cl. 260—677)

This invention relates to the hydrogenation of acetylenes and in particular to the selective hydrogenation of acetylenes in the presence of olefines.

Olefines such as ethylene and propylene as commercially produced frequently contain minor amounts of acetylenes for example, acetylene and methyl acetylene. Such commercially available olefines may not be suitable for use in many chemical processes for example, polymerisation processes, unless the acetylenes are first removed or rendered innocuous for example, by hydrogenation. It is very convenient to hydrogenate the acetylenes for example, acetylene to ethylene or methyl acetylene to propylene. However, in such a hydrogenation process it is difficult to ensure that substantially all of the acetylenes are hydrogenated to olefines without substantial hydrogenation of olefines also occurring.

We have now found that the acetylenes present in gas mixtures comprising an olefine and a minor amount of an acetylene can be very efficiently selectively hydrogenated in a two-stage process employing a catalyst comprising palladium supported on alumina and a gas thereby produced which may contain less than 0.005 percent of acetylenes.

According to the present invention therefore, there is provided a process for the selective hydrogenation of acetylenes in a gas mixture also containing one or more olefines which comprises a first stage in which the gas mixture together with hydrogen in excess of that required to hydrogenate the acetylenes to olefines, is passed over a catalyst comprising palladium supported on alumina the mean radius of whose pores is not less than 100 Angstrom units and a second stage in which the gas leaving the first stage is passed over a catalyst comprising palladium supported on active alumina.

The catalyst employed in the first stage of the process is palladium supported on alumina which may be prepared as described in co-pending U.S. application Serial No. 9,441, filed February 18, 1960. The pores of the alumina should have a mean radius of not less than 100 Angstrom units and preferably not greater than 1400 Angstrom units. More preferably the pores of the alumina should have a mean radius within the range 200 to 700 Angstrom units.

By mean pore radius is meant the parameter whose value is determined by the following method which is applied to samples of the alumina which have been degassed at room temperature for 30 minutes at a pressure of $10^{-3}$ mm. or below.

(1) The density of the alumina immersed in mercury at 20° C. and 900 mm. pressure, under which conditions about 15 minutes are allowed for attainment of equilibrium, is determined; this density is the average density of material containing pores not penetrated by mercury, that is pores of radius smaller than about $6\times10^4$ Angstrom units;

(2) The density of the alumina immersed in helium at room temperature is determined; this is the true density of the ultimate solid material;

(3) The reciprocal of the density in helium is subtracted from the reciprocal of the density in mercury; the difference is equal to the total pore volume V per gram of alumina;

(4) The surface area A per gram of the alumina is found by the method of Brunauer, Emmett and Teller (J. Amer. Chem. Soc. 60, 309 (1938)), by measuring the quantity of argon adsorbed on the catalyst at $-183°$ C.; in calculating the surface area the cross-sectional area of the argon atom is taken to be 14.4 square Angstrom units;

(5) The mean pore radius $\bar{r}$ is determined by substituting the above determined volume V and area A in the formula $$\bar{r}=\frac{2V}{A}$$

which is derived on the assumption that the pores are cylindrical and of the same size. If the volume V is expressed in cubic centimetres and the area A is expressed in square centimetres the mean radius $\bar{r}$ is in centimetres and should be multiplied by $10^8$ to give the mean radius in Angstrom units.

Preferably the statistical distribution of the pore radii of the alumina about the mean value should be narrow in order to provide a highly selective catalyst. A suitably narrow statistical distribution is obtained if the surface area of the alumina as determined by the method of Brunauer, Emmett and Teller, is within the range 5 to 65 square metres per gram, more preferably 10 to 30 square metres per gram.

Alumina suitable as a support for the first stage catalyst may be made by heating active alumina for example, gamma-alumina at temperatures above 800° C. and below 1300° C., preferably at 940° C. to 1100° C. The period of heating may be suitably about 2 to 6 hours. However, the period of heating may be longer than 6 hours particularly at temperatures in the lower part of the specified range. If desired, aluminium compounds which on heating yield active alumina may be used in preparing the alumina support.

The catalyst used in the second stage of the process is palladium supported on active alumina. Active alumina contains gamma-alumina and is well known for use as an adsorbent, a catalyst and a catalyst support. It may be obtained by dehydrating alumina hydrates which are then calcined at temperatures below 850° C., very suitably at 600° C. to 650° C.

The alumina used in preparing both the first and second stage catalysts may be in the form of small lumps or pellets which may be of any shape for example spherical or cylindrical.

A convenient pellet is a cylindrical pellet ⅛ inch in length and ⅛ inch diameter.

In preparing both the first and second stage catalysts, the palladium may be deposited on the alumina support by any of the known procedures for making supported catalysts. Very suitably the alumina is impregnated with an aqueous solution of a palladium salt for example, the nitrate and the impregnated alumina then dried. The dried catalyst may then be used in the process of the invention or it may first be heated to decompose the palladium salt. The temperature at which the decomposition is effected may be suitably up to about 500° C. preferably within the range 150° C. to 400° C. Further, the catalyst may be treated with a reducing gas such as hydrogen to reduce any palladium oxide to the metal before use in the process of the invention. The reduction may suitably be carried out at a temperature within the range 25° to 450° C.

The palladium content of the second-stage catalyst may be up to 5 percent by weight although in practice a catalyst containing more than 1 percent by weight of palladium may not be sufficiently selective. Thus it is preferred that the second stage catalyst contains less than 1 percent by weight of palladium and more preferably 0.01 to 0.4 percent by weight of palladium. Examples of very suitable palladium contents are 0.04, 0.12 and 0.15 percent by weight.

The second-stage catalyst may contain less than 0.01, for example 0.001 percent by weight of palladium. However, as already stated it is preferred that the catalyst contain at least 0.01 percent by weight of palladium. The use of a catalyst containing a relatively high percentage of palladium enables the process of the invention to be operated at high space velocities and at temperatures below 100° C. Thus, the process of the invention has been operated using a catalyst containing 0.10 to 0.15 percent by weight of palladium at space velocities of 7000 to 10,000 litres of gas per litre of catalyst filled space per hour and at temperatures of 45 to 55° C. Even at such high space velocities very good selective hydrogenation of the acetylenes contained in the gas stream was achieved.

The first-stage catalyst may have a palladium content similar to that disclosed for the second-stage catalyst. Usually, however, the palladium content of the first-stage catalyst will be less than that of the second-stage catalyst and preferably within the range 0.01 to 0.4 percent by weight. It is usually desirable that the first stage catalyst does not contain more than 0.1 percent by weight of palladium when the gas stream fed to the first stage contains hydrogen in an amount greatly in excess of the amount theoretically required to hydrogenate the acetylenes in the gas stream to olefines.

While the process of the invention is applicable to the selective hydrogenation of acetylenes in other gas mixtures it is particularly applicable to the selective hydrogenation of acetylenes in gas mixtures containing ethylene produced by the thermal cracking of hydrocarbons such as ethane, propane and light distillates obtained in the refining of petroleum. Such gas mixtures may have a composition by volume as follows: hydrogen 8–45%, methane 2–40%, acetylene 0.1–1.0%, ethylene 20–45%, ethane 3–60%, propylene up to 20%, and propane up to 10%.

It is preferred that the gas mixture does not contain more than 0.5% of $C_4$ or higher olefines, for example of butadiene.

The process of the invention is particularly applicable to the selective hydrogenation of gas mixtures containing 2% or less of acetylenes.

The gas mixture subjected to the process of the invention should contain hydrogen in an amount at least sufficient to hydrogenate the acetylenes to the corresponding olefines. If the gas mixture to be treated does not contain this amount of hydrogen, hydrogen should be added as necessary.

The process of the invention is particularly applicable to the selective hydrogenation of acetylenes in gas mixtures containing large quantities of hydrogen.

The process of the invention may suitably be operated at pressures within the range 15 to 500 preferably 100 to 200 lb. per square inch gauge and at space velocities within the range 1000 to 15,000 preferably 5000 to 10,000 litres per litre of catalyst filled space per hour, the gas volume being measured at 20° C. and atmospheric pressure.

The temperature used during the first stage of the process is suitably within the range 40° to 200° C. With a fresh charge of catalyst the temperature may be in the lower part of the said range for example 50° C., and this temperature may subsequently be increased as necessary to maintain a high throughput. It is usually unnecessary to use a temperature above about 120° C. The temperature in the second stage of the process is controlled similarly to that in the first stage and will usually be somewhat lower than the temperature in the first stage.

Preferably, the operating conditions in the first stage of the process are adjusted to reduce the acetylenes content of the gas mixture to less than 0.1% for example, to about 0.025%.

In the second stage of the process it is very desirable that the proportion of hydrogen to acetylenes is carefully controlled to ensure that hydrogenation of the acetylenes to olefines takes place without any substantial amount of hydrogenation of olefines also occurring. Suitably 2 to 3 moles of hydrogen should be present for each molecule of acetylenes.

It may be necessary to reduce the hydrogen content of the gas leaving the first stage of the process before passing it to the second stage. This can conveniently be done by removing the hydrogen from the gas leaving the first stage and then adding the required amount of hydrogen. While removing hydrogen, it is usually convenient to remove heavy ends from the gas and to concentrate the gas by removing methane and if desired, $C_3$ hydrocarbons.

Example 1

The two catalysts used in the following experiments were prepared by impregnating alumina in the form of ⅛ inch diameter pellets, with palladium nitrate, drying the impregnated material and heating it in the presence of hydrogen at 400° C. The catalysts contained 0.04% by weight of palladium. The alumina used in making the first stage catalyst was prepared by heating pelleted active alumina (gamma-alumina) at 1000° C.; its pores had an average pore radius of 278 Angstrom units and its total surface area was 22.1 square metres per gram. The alumina used in making the second stage catalyst was active alumina (gamma-alumina).

A gas containing 50% by volume of $C_2$ and $C_3$ olefines, 15% by volume of hydrogen, about 34% by volume of paraffin hydrocarbons, less than 0.5% by volume of $C_4$ olefines and 0.4% by volume of acetylene hydrocarbons was passed at a pressure of 150 lb./square inch gauge and a space velocity of 5000 litres (measured at 20° C. and atmospheric pressure) per litre of catalyst filled space per hour over the first stage catalyst at a temperature of 80° C.

The gas which now contained 0.04% acetylene was fractionated to give a fraction containing mainly ethylene and ethane, substantially no hydrogen and 0.08% acetylenes. Between 2 and 3 moles of hydrogen per mole of acetylene present were added to this fraction which was then passed at a pressure of 150 lb./square inch gauge and a space velocity of 5000 litres (measures at 20° C. and atmospheric pressure) per litre of catalyst filled space per hour, over the second stage catalyst at a temperature of 65° C. The resulting gas contained 0.0025% by volume of acetylenes.

Example 2

The first stage of the experiment described in Example 1 was repeated and a gas obtained which after fractionation to remove hydrogen, contained approximately 3% methane, 17% ethane, 78.5% ethylene, 1.5% propylene and 0.08% acetylenes. This gas was mixed with sufficient hydrogen to give a molar ratio hydrogen:acetylenes of 3:1 and passed at a pressure of 100–150 pounds per square inch gauge and a space velocity of 7000 litres (measured at 20° C. and atmospheric pressure) per litre of catalyst per hour over a palladium-on-active (gamma) alumina catalyst containing 0.12% by weight of palladium. The catalyst temperature was 45° to 50° C. The exit gas contained less than 0.0025% acetylenes and no hydrogenation of olefines could be detected.

The same results were obtained in a similar experiment using a palladium-on-active (gamma) alumina catalyst containing 0.15% by weight of palladium. In this experiment the pressure of the gas was 100 to 150 pounds per square inch gauge and the space velocity was 10,000 litres (measured at 20° C. and atmospheric pressure) per litre of catalyst per hour. The catalyst temperature was 50° to 55° C.

Example 3

The first stage of the process described in Example 1 was repeated using a palladium supported on alumina catalyst containing 0.15% by weight of palladium. The alumina had been prepared by heating active (gamma)

alumina at 100° C. and its pores had an average radius of 278 Angstrom units. A gas containing 50% $C_2$ and $C_3$ olefines, 15% hydrogen, 34% paraffins, less than 0.5% $C_4$ olefines of 0.4% acetylenes was passed at a pressure of 100 to 150 pounds per square inch gauge and a space velocity of 7000 litres (measured at 20° C. and atmospheric pressure) per litre of catalyst per hour over the catalyst. The temperature of the catalyst was 69° C. The gas leaving the catalyst contained less than 0.04% acetylenes and the amount of olefines hydrogenated was less than 0.5% of the olefines present in the untreated gas.

This experiment was repeated using the same starting materials and the same process conditions except that the space velocity of the gas over the catalyst was 10,000 litres (measured at 20° C. and atmospheric pressure) per litre of catalyst per hour and the catalyst temperature was 72–73° C. The gas leaving the catalyst again contained less than 0.04% acetylenes while the amount of olefines hydrogenated was less than 0.5 percent of the olefines present in the untreated gas.

The acetylenes content of the exit gas could be further reduced by applying the second stage process as described in Examples 1 and 2.

We claim:
1. A process for the selective hydrogenation of acetylenes in a gas mixture containing 8–45% hydrogen, 0.1–1% acetylene, 20–45% ethylene, up to 20% propylene, the rest being saturated hydrocarbons which comprises a first stage in which the gas mixture together with hydrogen which is in excess of that required to hydrogenate the acetylenes to olefines, is passed, at a temperature of 40 to 200° C. over a catalyst consisting of palladium supported on alumina, calcined at a temperature of 800 to 1300° C., the mean radius of whose pores is at least 200 Angstrom units and not more than about 1400 Angstrom units, and which has a surface area in the range of 5 to 65 square meters per gram, and a second stage in which the hydrogen content of the gas leaving the first stage is reduced to about 2 to 3 moles of hydrogen per mole of acetylenes, and the gas is then passed at a temperature of 40 to 200° C. over a catalyst consisting of palladium supported on a gamma-alumina-containing support.

2. A process as claimed in claim 1 in which the first stage catalyst is prepared from alumina the mean radius of whose pores is within the range 200 to 700 Angstrom units.

3. A process as claimed in claim 1 in which the palladium content of the catalysts is at most 1 percent by weight.

4. A process as claimed in claim 3 in which the palladium content of the catalysts is within the range 0.01 to 0.4 percent by weight.

5. A process as claimed in claim 1 in which the pressure is within the range 15 to 500 pounds per square inch gauge.

6. A process as claimed in claim 1 in which the space velocity of the gas mixture is within the range 1000 to 15,000 litres per litre of catalyst filled space per hour, the gas volume being measured at 20° C. and atmospheric ressure.

7. A process as claimed in claim 1 in which the gas mixture contains at most 0.5 percent of olefines containing more than 3 carbon atoms.

8. A process as claimed in claim 1 in which the the gas mixture contains at most 2 percent of acetylenes.

9. A process as claimed in claim 1 in which the gas mixture introduced into the second stage of the process contains at most 0.1 percent of acetylenes.

10. A process as claimed in claim 1 in which said surface area is within the range 10 to 30 square meters per gram.

11. A process as claimed is claim 5 in which the pressure is within the range 100 to 200 pounds per square inch gauge.

12. A process as claimed is claim 6 in which the space velocity of the gas mixture is within the range 5000 to 10,000 litres per litre of catalyst filled space per hour, the gas volume being measured at 20° C. and atmospheric pressure.

References Cited in the file of this patent
UNITED STATES PATENTS

| | | |
|---|---|---|
| 2,802,889 | Frevel et al. | Aug. 13, 1957 |
| 2,814,653 | Hogan et al. | Nov. 26, 1957 |
| 2,927,141 | Cohn et al. | Mar. 1, 1960 |
| 2,946,829 | Likins et al. | July 26, 1960 |
| 3,036,137 | Challis et al. | May 22, 1962 |